July 11, 1939.  G. E. McCONNELL  2,165,565

GRAVITY LIQUID MEASURING DEVICE

Filed Feb. 7, 1938

INVENTOR.
Guy E. McConnell
BY A. B. Bowman
ATTORNEY.

Patented July 11, 1939

2,165,565

UNITED STATES PATENT OFFICE 2,165,565

GRAVITY LIQUID MEASURING DEVICE

Guy E. McConnell, Los Angeles, Calif.

Application February 7, 1938, Serial No. 189,185

8 Claims. (Cl. 221—147)

My invention relates to gravity liquid measuring devices and the objects of my invention are:

First, to provide a gravity actuated device for measuring liquids which is operated by tilting the bottle or container which holds the liquid;

Second, to provide a device of this class with a valve at the outlet for closing the outlet while the measure is being filled and then opening the same for emptying the contents of the measure by various tilting of the bottle or container;

Third, to provide a device of this class which is particularly applicable for use for measuring a quantity of liquor for making high balls, cocktails etc.;

Fourth, to provide a device of this class which is applicable for use in connection with bottles or other relatively small outlet containers;

Fifth, to provide a device of this class which may be readily and quickly positioned in connection with the bottle or other container;

Sixth, to provide a device of this class in which the valve is operated by gravity and controlled by the various tilting of the liquid container; and Seventh, to provide a device of this class which is very simple and economical of construction, efficient in its action, easy to operate and which will not readily deteriorate or get out of order.

Figure 1:
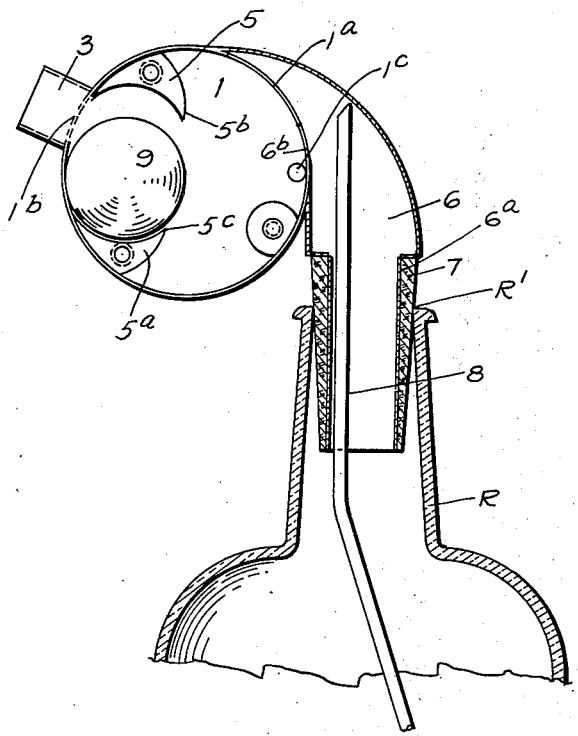
Figure 2:
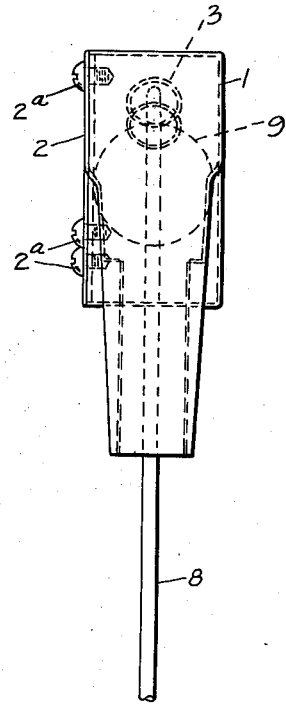
Figure 3:
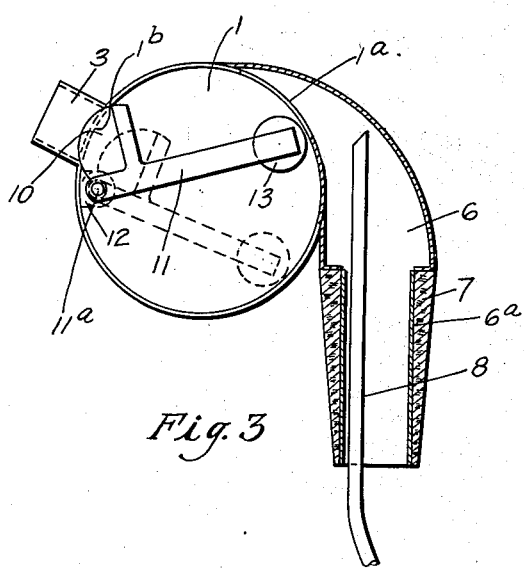

With these and other objects in view as will appear hereinafter my invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a sectional view of a fragmentary portion of a bottle showing my gravity liquid measuring device in the preferred form in section positioned therein ready for use and showing some of the parts and portions in elevation to facilitate the illustration; Fig. 2 is a side elevational view thereof at right angles to that of Fig. 1 and Fig. 3 is a sectional view of my device shown in a slightly modified form from that of Figs. 1 and 2.

Similar characters of reference refer to similar parts and portions throughout the several views of the drawing.

The valve and measuring casing 1, valve casing cover 2, valve casing outlet 3, valve cage members 4 and 5, valve casing stem 6, cork member 7, vent member 8, and valve member 9 constitute the principal parts and portions of my gravity liquid measuring device in its preferred form.

The liquid receptacle R is shown in the form of a bottle, but may be of any form of relatively small opening receptacle for pouring contents therefrom. Mounted in the opening end of the receptacle R is a valve casing stem 6 shaped as shown best in Figs. 1 and 2 of the drawing provided with a reduced cylindrical open end 6a which is adapted to fit loosely in the open end 10 of the receptacle R, and mounted over this cylindrical portion 6a is a cork member 7 which is tapered and cylindrical in form and may be made of rubber or other resilient material adapted to form a seal and fit tightly into the open end $R^1$ of the receptacle R. This member 6 is provided with a vent member 8 which is secured to the inner side of the member 6a and extends downwardly on an angle toward the side of the bottle as shown best in Fig. 1 of the drawing. This is for the purpose of providing a vent to permit the ready pouring of the liquid from the receptacle R. This casing stem 6 is tapered and broadens gradually upwardly as shown best in Fig. 2 of the drawing and merges with the periphery of the casing 1, the casing 1 and one side of the member 6 forming a partition 6b and leaving an opening 1a for the fluid to pass through into the casing 1. The casing 1 is hollow, cylindrical in form and open at one side and mounted on this open side is a cover 2 which is secured thereto by means of screws 2a, thus forming a relatively tight casing for measuring fluid from the receptacle R. This casing 1 is provided on the opposite side from the stem 6 with an outlet member 3 which extends some distance therefrom and which surrounds an outlet opening 1b in the member 1. Mounted at one side of this opening 1b in the casing 1 is a valve cage member 5 which conforms to the outer surface of the valve and on the opposite side spaced some distance from the outlet 1b is another similar cage member 5a and mounted between the cage members 5 and 5a is a ball valve 9 which fits between the cage members 5 and 5a and is of slightly larger diameter than the space between the points 5b and 5c of the members 5 and 5a so that the ball valve member 9 will always remain in the cage. This cage member is provided close to the partition 6b with a small vent opening 1c.

In the modified form of construction shown in Fig. 3 of the drawing, the structure is the same throughout except that in lieu of the ball valve 9 there is provided a partially spherical valve member 10 which is secured to a lever 11 which lever 11 is pivotally mounted at 11a on a lug 12. Secured on the inner surface of the casing near the opening 1b and mounted on the extended end of the lever 11 is a weight 13 secured thereto. This weight is adapted to operate the lever 11 and valve 10 into open and closed positions over the outlet opening 1b with the tilting of the liquid receptacle with the measuring device in position thereon.

The operation of the device in the preferred form is as follows:

The receptacle R is tilted to a normal position for pouring with the outlet opening 3 extending downwardly. Upon this tilting, the ball valve 9 will roll against the cage member 5 and close the opening 1b. Then the contents will flow and fill the casing 1. Then by tilting the bottle downwardly the flow will stop into the casing 1 and the ball valve 9 will roll downwardly in the position shown by solid line in Fig. 1 of the drawing and the fluid will then flow out into a receptacle for receiving the same.

The operation of the modified form is as follows: The bottle is tilted in the same manner and the weight 13 will close the valve 10 against the opening 1b and the casing 1 will be filled after which the receptacle is turned downwardly until the flow is stopped into the receptacle and the weight 13 will lower the valve 10 from the opening and permit the flow of the fluid into a receptacle for receiving the same.

Though I have shown and described a particular construction, combination and arrangement of parts and portions and a certain modification thereof, I do not wish to be limited to this particular construction, combination and arrangement, but desire to include in the scope of my invention the construction, combination and arrangement substantially as set forth in the appended claims.

Having thus described my invention what I claim as new and desire to secure by Letters Patent is:

1. In a gravity liquid measuring device, a tubular inlet member provided with a tapered portion adapted to fit snugly in a receptacle outlet opening, a measuring casing communicating with the one side thereof in offset relation therewith provided with an outlet opening in the opposite side from said tubular inlet and a gravity actuated valve member mounted in said casing adapted to gravitate over and off of said measuring casing outlet opening with the various tilting of said receptacle.

2. In a gravity liquid measuring device, a tubular inlet member provided with a tapered portion adapted to fit snugly in a receptacle outlet opening, a measuring casing communicating with the one side thereof in offset relation therewith provided with an outlet opening in the opposite side from said tubular inlet, a gravity actuated valve member mounted in said casing adapted to gravitate over and off of said measuring casing outlet opening with the various tilting of said receptacle, and a vent means for said tubular inlet member.

3. In a gravity liquid measuring device, a tubular inlet member provided with a tapered portion adapted to fit snugly in a receptacle outlet opening, a measuring casing communicating with the one side thereof in offset relation therewith provided with an outlet opening in the opposite side from said tubular inlet, a gravity actuated valve member mounted in said casing adapted to gravitate over and off of said measuring casing outlet opening with the various tilting of said receptacle, a vent means for said tubular inlet member, and a vent means for said casing.

4. In a gravity liquid measuring device, a tubular inlet member provided with a tapered portion adapted to fit snugly in a receptacle outlet opening, a measuring casing communicating with the one side thereof in offset relation therewith provided with an outlet opening in the opposite side from said tubular inlet, a gravity actuated valve member mounted in said casing adapted to gravitate over and off of said measuring casing outlet opening with the various tilting of said receptacle, a vent means for said tubular inlet member, a vent means for said casing, said valve including a ball and cage members for controlling the movement of said ball.

5. In a gravity liquid measuring device, a tubular inlet member provided with a tapered portion adapted to fit snugly in a receptacle outlet opening, a measuring casing communicating with the one side thereof provided with an outlet opening, a gravity actuated valve member mounted in said casing adapted to gravitate over and off of said measuring casing outlet opening with the various tilting of said receptacle, a vent means for said stem, a vent means for said casing, said valve including a partially spherical member, a pivotally mounted lever upon which said partially spherical member is secured, and a weight on the end of said lever.

6. In a gravity liquid measuring device, a measuring casing member with an inlet on one side thereof, a tubular inlet member with a curved diminishing end communicating tangentially at one side with said inlet, an outlet in the opposite side of said measuring casing, and a gravity actuated valve adapted to seat on said outlet.

7. In a gravity liquid measuring device, a measuring casing member with an inlet on one side thereof, a tubular inlet member with a curved diminishing end communicating tangentially at one side with said inlet, an outlet in the opposite side of said measuring casing, a gravity actuated valve adapted to seat on said outlet, and means for resiliently securing said stem in the opening of a receptacle.

8. In a gravity liquid measuring device, a measuring casing member with an inlet on one side thereof, a tubular inlet member with a curved diminishing end communicating tangentially at one side with said inlet, an outlet in the opposite side of said measuring casing, a gravity actuated valve adapted to seat on said outlet, means for resiliently securing said stem in the opening of a receptacle, and means for venting said measuring casing.

GUY E. McCONNELL.